(12) United States Patent
Delame-Quentin

(10) Patent No.: US 12,135,462 B2
(45) Date of Patent: Nov. 5, 2024

(54) RECEIVING STRUCTURE/OPTICAL INTERFACE MODULE ASSEMBLY

(71) Applicant: LATELEC, Toulouse (FR)

(72) Inventor: Cyrille Delame-Quentin, Toutens (FR)

(73) Assignee: LATELEC, Toulouse (FR)

( * ) Notice: Subject to any disclaimer, the term of this patent is extended or adjusted under 35 U.S.C. 154(b) by 215 days.

(21) Appl. No.: 17/780,956

(22) PCT Filed: Dec. 18, 2020

(86) PCT No.: PCT/EP2020/087050
§ 371 (c)(1),
(2) Date: May 27, 2022

(87) PCT Pub. No.: WO2021/123188
PCT Pub. Date: Jun. 24, 2021

(65) Prior Publication Data
US 2023/0035631 A1    Feb. 2, 2023

(30) Foreign Application Priority Data

Dec. 19, 2019  (FR) ........................................ 1914816
Mar. 11, 2020  (FR) ........................................ 2002417

(51) Int. Cl.
*G02B 6/00*    (2006.01)
*G02B 6/38*    (2006.01)
(Continued)

(52) U.S. Cl.
CPC ......... *G02B 6/4452* (2013.01); *G02B 6/3897* (2013.01); *H04B 10/1143* (2013.01)

(58) Field of Classification Search
CPC ...... G02B 6/4452; G02B 6/3897; G02B 6/00; H04B 10/1143; H04B 10/803
See application file for complete search history.

(56) References Cited

U.S. PATENT DOCUMENTS 5,093,879 A *  3/1992  Bregman .............. H01L 31/167
                                            398/164
8,306,421 B1 *  11/2012  Mazuk ............... H04B 10/0793
                                            398/168
(Continued)

FOREIGN PATENT DOCUMENTS

EP    0348329 A    12/1989
EP    0463390 A2    1/1992

OTHER PUBLICATIONS

C. J. Moss, "Optical interconnect for modular avionics," Jan. 1, 1994, pp. 6/1-6/5, IEE, London, UK.
(Continued)

*Primary Examiner* — Jennifer Doan
(74) *Attorney, Agent, or Firm* — H&I PARTNERS; Chai Im; C. Andrew Im

(57) ABSTRACT

An assembly including an avionics cabinet and a module. The module being insertable into a recess of the avionics cabinet along a longitudinal axis and securely held there in a reversible manner in an operative position. The module having a first face opposite a first wall of the avionics cabinet. The first wall includes a first optical array having first optical emitters and first optical receivers. The first face of the module includes a second optical array having second optical emitters and second optical receivers. When the module is in the operative position, the first and second optical arrays are spaced apart from each other by a predefined distance. Each second optical emitter is arranged opposite a first optical receiver and each second optical receiver is arranged opposite a first optical emitter.

9 Claims, 6 Drawing Sheets

(51) Int. Cl.
*G02B 6/44* (2006.01)
*H04B 10/114* (2013.01)

(56) References Cited

U.S. PATENT DOCUMENTS

| | | |
|---|---|---|
| 2008/0107373 A1 | 5/2008 | Lee |
| 2010/0028018 A1 | 2/2010 | Tan et al. |
| 2016/0234581 A1* | 8/2016 | Gauthier .............. H04B 10/803 |

OTHER PUBLICATIONS

Rick C. Stevens et al., "Optical communication for advanced avionics systems," Digitalavionics Systems Conference, 1997. 16th DASC., Oct. 26, 1997, pp. 3.3-12-3.3-19, vol. 1, IEEE, NY, USA.

* cited by examiner

RECEIVING STRUCTURE/OPTICAL INTERFACE MODULE ASSEMBLY

RELATED APPLICATIONS

This application is a § 371 application of PCT/EP2020/087050 filed Dec. 18, 2020, which claims priority from French Patent Application No. 1914816 filed Dec. 19, 2019, and French Patent Application No. 2002417 filed Mar. 11, 2020, each of which is incorporated herein by reference in its entirety.

TECHNICAL FIELD OF THE INVENTION

The invention relates to an assembly including a receiving structure and a module. In particular, the invention is intended for an application in the aeronautical, whether civil or military, field. More particularly, it applies although without limitation, to aircraft furniture.

BACKGROUND OF THE INVENTION

Current aircrafts, whether civil or military, generally include an avionics bay, consisting of several receiving structures, commonly called avionics cabinets, and intended to connect electronic or optical equipment distributed in the aircraft, via cables. Each receiving structure 10 is conventionally in the form of a frame equipped with slots for receiving modules 20, primarily electronic ones. For example, these modules embed electronic boards and components for the electronic/electrical control and management of the equipment of the aircraft.

Each module 20 is removable in the receiving structure 10 and is equipped, as illustrated in FIGS. 1a and 1b, at one face, called the rear face 22, with a set of connectors 90b, with electrical or optical contacts. Each connector 90b is intended to be connected to or disconnected from a complementary connector 90a disposed at a bottom wall of the receiving structure 10, with bottom wall commonly called backplane 13.

For example, these connectors 90a, 90b, with electrical or optical contacts, may be ARINC type connectors.

Advantageously, these connectors allow achieving the continuity of signal transmission between the modules or between the modules and the equipment.

The connection between the connectors 90a of the receiving structure 10 and the complementary connectors 90b of a module 20 is done during the insertion of said module into the receiving structure, by sliding. The module is guided in a conventional manner in one of the slots (not represented) of the receiving structure, by sliding on a contact surface, until the complementary connectors are coupled. FIG. 1a illustrates the insertion of a module 20 into the receiving structure 10. The contact surface is represented by the arrow A. The direction of insertion of the module is illustrated by the arrow B. In turn, FIG. 1b illustrates the positioning of the module 20, once connected to the receiving structure 10.

The mechanical constraints imposed by the alignment of the connectors disposed on the receiving structure and those disposed on the module make the assembly hyperstatic. Hence, the imposed clearances, in particular the clearances between the contact surface and the functional surfaces of each connector (surfaces illustrated in FIG. 1b by the arrows C) should be very small, which generates strong industrial constraints in the manufacture of the connectors of the backplane of the receiving structure and the module. Such constraints make these components expensive, complex to manufacture and represent a non-negligible weight.

Moreover, the increase in the clearances, even the minimum ones (due for example to slight mechanical deformations, thermal expansions, etc.), between the contact surface and the functional surfaces of each connector could lead, upon the insertion of a module into the receiving structure, to a risk of bending of the electrical contacts in the connectors or of misalignment of the surfaces of the optical contacts.

Similarly, when a module is not perfectly inserted into the receiving structure, the same risk of damage or misalignment of the contacts of the connectors exists. Consequently, the systems for inserting the modules into the receiving structure require significant manufacturing and assembly accuracy in order to comply with the approach and connection constraints between connectors.

OBJECT AND SUMMARY OF THE INVENTION

The present invention aims to overcome the aforementioned drawbacks.

In particular, the present invention allows getting rid of any physical contact between the receiving structure and the module(s) while guaranteeing the continuity of signal transmission between the modules or between the modules and the equipment.

To this end, the present invention provides an assembly including a module and a receiving structure, said module being intended to be inserted into a slot of the receiving structure according to a longitudinal axis X and to be reversibly held fixed therein in a so-called operative position.

Preferably, the receiving structure is an avionics cabinet.

The module includes a first face intended to face a first wall of the receiving structure. The first wall of the receiving structure includes a first optical network including first optical emitter units and first optical receiver units. The first face of the module includes a second optical network including second optical emitter units and second optical receiver units. When the module is in the operative position in the avionics cabinet, the first optical network and the second optical network are remote from each other by a predefined distance (d) and:

- each second optical emitter unit of the first face of the module is disposed opposite a first optical receiver unit of the first wall of the receiving structure,
- each second optical receiver unit of the first face of the module is disposed opposite a first optical emitter unit of the first wall of the receiving structure.

Each first/second optical emitter unit is configured to emit an optical beam with a given wavelength. Each second optical emitter unit is configured to emit an optical beam with a given wavelength, preferably distinct from that of the optical beam emitted by the first/second optical emitter unit.

By the use of the first and second optical networks and by their arrangement, such an assembly enables the creation of an optical interface between the receiving structure and a module. Said optical interface consists of a plurality of optical links, an optical link being established between a first optical emitter unit and a second optical receiver unit or a second optical emitter unit and a first optical receiver unit.

Advantageously, the present invention allows overcoming the mechanical constraints of plugging complementary connectors between a receiving structure and a module of the prior art by replacing said connectors with two complementary optical networks facing each other, a first network disposed at a first wall of the receiving structure and a second network disposed at a first face of the module.

Advantageously, the first wall of the receiving structure may be any wall forming the receiving structure. Thus, the first wall may be a lower wall, an upper wall, a side wall or a bottom wall, called backplane.

Similarly, the first face of the module may be any face forming the module. Thus, the first face may be a lower face, an upper face, a side face or a rear face. The first face of the module is the face intended to face the first wall of the receiving structure, when the module is in the operative position.

Thus, the assembly is no longer constrained by the use of a single interface, that one between the backplane of the receiving structure and the rear face of the module, as is the case with existing assemblies. Thus, it is possible to have a plurality of optical interfaces, with an optical interface created for example at each wall of the receiving structure and of the associated face of the module, when the module is in the operative position.

The communication is now done in contactless manner, via optical beams, and no longer via physical contact between two complementary connectors. Advantageously, the propagation of the optical beams is done in a free space.

Advantageously, the suppression of complex connectors allows overcoming the problems of installation complexity and of weight of these connectors. The invention ultimately allows for a reduction in the mass of the receiving structure-modules assembly.

Since the optical links allow for a slight misalignment of the optical axes of the emitted optical beams, the invention allows overcoming the constraints related to the accuracy of the mounting clearances between the receiving structure and a module.

The invention also allows for an increase in link speeds.

By suppressing the connectors, the invention allows for immunity to any type of electromagnetic radiation on the link, to any electromagnetic coupling of the connectors with each other, to any electrical effect between the connectors (arc, leakage, etc.) and to any contamination of the connectors (leakage, salty air, etc.).

In particular embodiments, the invention further complies with the following features, implemented separately or in each of their technically possible combinations.

In particular embodiments of the invention, a first optical emitter unit and/or a second optical emitter unit include a light source, for example of the laser diode or light-emitting diode type.

In one variant, a first optical emitter unit and/or a second optical emitter unit consists of a light source. In particular embodiments of the invention, a first optical receiver unit and/or a second optical receiver unit include a photodetector, for example of the photodiode type.

In one variant, a first optical receiver unit and/or a second optical receiver unit consists of a photodetector.

In particular embodiments of the invention, the first optical network is in the form of a strip including an alternation of rows or columns of light sources and photodetectors.

In particular embodiments of the invention, the second optical network is in the form of a strip including an alternation of rows or columns of light sources and photodetectors.

In particular embodiments of the invention, a first optical emitter unit and/or a second optical emitter unit and/or a first optical receiver unit and/or a second optical receiver unit includes a light source associated with an optical fibre. Such an optical fibre allows offsetting the light source.

In one variant, a first optical emitter unit and/or a second optical emitter unit and/or a first optical receiver unit and/or a second optical receiver unit consists of a light source associated with an optical fibre.

In particular embodiments of the invention, a first optical receiver unit and/or a second optical receiver unit comprises a photodetector associated with an optical fibre. Such an optical fibre allows offsetting the photodetector.

In one variant, a first optical receiver unit and/or a second optical receiver unit consists of a photodetector associated with an optical fibre.

In particular embodiments of the invention, to overcome the deposit of dust on the optical components, the first optical network includes a protective seal disposed around each first optical emitter unit and first optical receiver unit. Similarly, the second optical network includes a protective seal disposed around each second optical emitter unit and second optical receiver unit. When the module is in the operative position in the receiving structure, each protective seal located at the first optical network is configured to open in contact with a protective seal located at the second optical network.

The invention also relates to a receiving structure for an assembly as disclosed and in accordance with at least one of its embodiments.

According to another aspect, the invention also relates to a module for an assembly as disclosed and in accordance with at least one of its embodiments.

According to yet another aspect, the present invention relates to an aircraft including an assembly as disclosed and in accordance with at least one of its embodiments, said assembly being intended to be integrated into an avionics bay of said aircraft.

BRIEF DESCRIPTION OF THE FIGURES

The invention will be better understood upon reading the following description, given as a non-limiting example, and made with reference to the following figures.

In these figures, identical reference numerals from one figure to another refer to identical or similar elements. Moreover, for clarity, the drawings are not to scale, unless stated otherwise.

DESCRIPTION OF THE EMBODIMENTS

The present invention relates to an assembly 100 including a receiving structure 10 and at least one module 20, preferably an electronic module. Said at least one module 20 is intended to be inserted into the receiving structure 10 and to be reversibly held fixed therein.

The invention is described in the particular context of one of its preferred fields of application in which the assembly 100 is intended to be installed in an aircraft. Said assembly is preferably intended to be integrated into an avionics bay of an aircraft.

However, nothing excludes disposing the assembly in any other type of vehicles or in buildings such as company buildings.

Figure 1A:
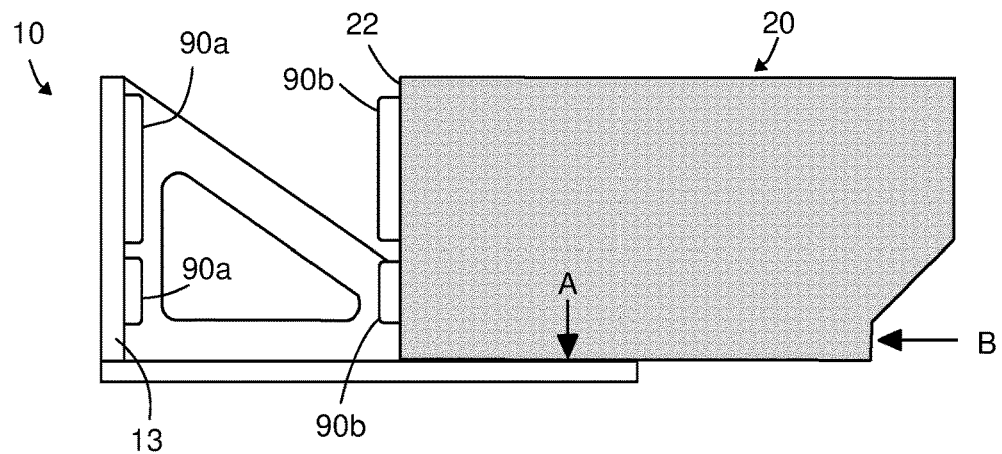
FIG. 1a illustrates the insertion of a module into a receiving structure according to the prior art.
Figure 1B:
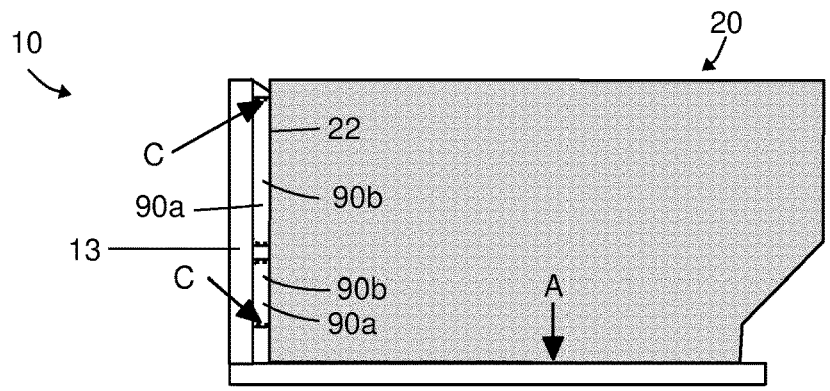
FIG. 1b illustrates the inserted module of FIG. 1a, connected to the receiving structure, according to the prior art.
Figure 2:
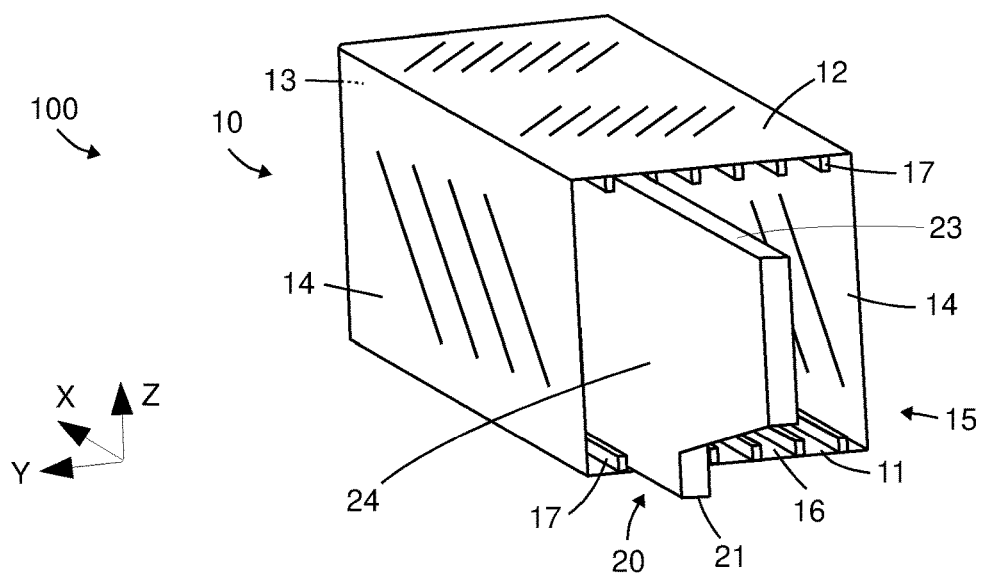
FIG. 2 represents a perspective view of an assembly comprising a receiving structure and a module during insertion, in a reference frame XYZ.

The receiving structure 10, also called avionics cabinet in the aeronautical field, is, in a known manner and as illustrated in FIG. 2, in the form of a frame including a lower wall 11, an upper wall 12, a bottom wall 13. The frame is open at one face, called the front face 15, opposite to the bottom wall 13, and may include two side walls 14. The bottom wall 13 is commonly referred to as the backplane. In general, the backplane 13 is intended, in conventional receiving structures, to cooperate with aeronautical wiring (not represented in the figures) conveying a distribution of electrical signals originating from the aircraft to the receiving structure 10.

In the remainder of the description, a reference frame including three axes XYZ orthogonal in pairs will be associated with the receiving structure 10. This reference frame is defined with respect to a relative position of the receiving structure 10 under standard conditions of use, in particular when the receiving structure is for example set on a floor of the aircraft.

This marker includes:
An X axis, called the longitudinal axis, corresponding to an axis of insertion of the module into the receiving structure, and oriented along a direction of insertion of the module 20 into the receiving structure 10,
A Y axis, called the transverse axis, perpendicular to the longitudinal axis, and oriented along a horizontal direction when the floor of the aircraft on which the receiving structure is set is horizontal,
A Z axis, called the vertical axis, perpendicular to the longitudinal axis and to the transverse axis, and oriented along a vertical direction when the floor of the aircraft on which the receiving structure is set is horizontal.

Thus, the terms "longitudinal", "lateral", "front", "rear", "top", "bottom", "upper" and "lower", and their derivatives or equivalents, are defined with respect to the different axes of this reference frame.

The receiving structure 10 includes one or several slot(s) 16, each slot 16 being intended to receive a module 20. When the receiving structure 10 includes several slots 16, the slots are aligned next to each other, according to the transverse axis Y, and separated for example by slides 17 extending, according to the longitudinal axis, along the lower wall 11 and the upper wall 12.

The receiving structure 10 according to the invention is intended to create, via at least one of its walls, a connection between modules 20 with each other and/or with equipment distributed in the aircraft.

Each module 20 is in the form of a case, for example parallelepipedic. Each module 20 has dimensions in length, width and thickness adapted to be inserted vertically, within a clearance, in a slot 16.

Each module 20 is inserted into a slot 16 of the receiving structure 10 by sliding of said module according to the longitudinal axis, i.e., from the front face 15 of said receiving structure 10 towards the backplane 13.

Figure 3:
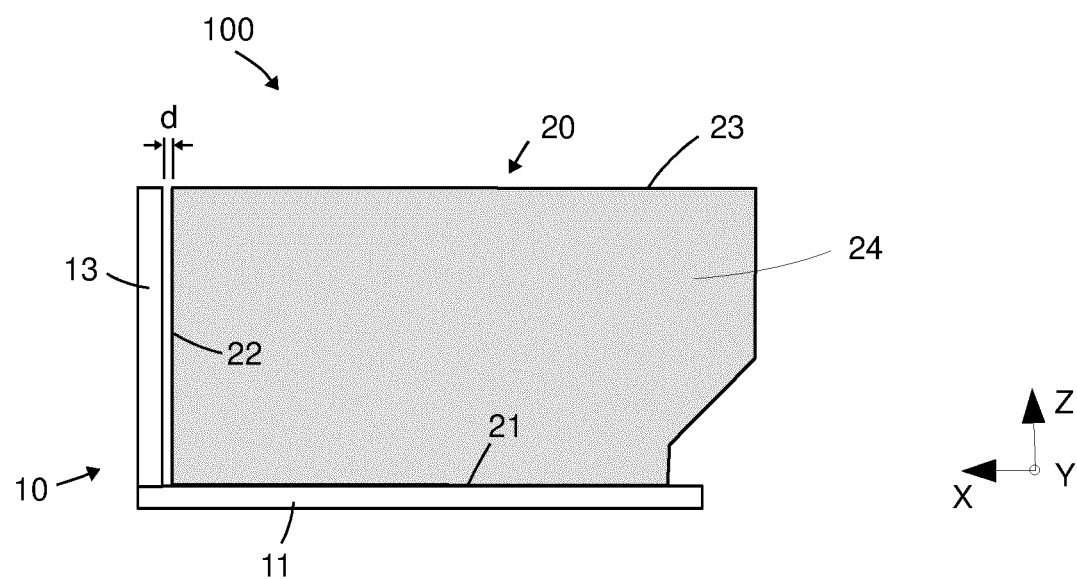
FIG. 3 represents a module, in an operative position, i.e., once inserted and locked in the receiving structure, according to the invention, in the plane XZ.

A module 20 is inserted into the receiving structure 10 up to a so-called operative position, in which said module is in place in the receiving structure 10 and locked, reversibly, in its slot 16. The module 20 then has a face, called lower face 21, in contact with the lower wall 11 of the receiving structure 10. The module 20 has a face, called rear face 22, opposite the backplane 13 of the receiving structure 10, as illustrated in FIG. 3. The module 20 may have a face, called side face 24, opposite one of the side walls 14 of the receiving structure 10. Similarly, the module may have a face, called upper face 23, opposite the upper wall 12 of the receiving structure 10.

In one embodiment (not represented), to lock or unlock a module 20 in its slot 16 of the receiving structure 10, said module includes a removable locking/unlocking device. Conventionally, a locking device may include a lever on the case of the module.

For example, each module 20 includes one or several board(s) including a printed circuit. Each module 20 has a substantially identical shape, which is inserted indifferently into any slot. A module differs from another only at the including all of the electronic components necessary to carry out an electronic function of said board.

Thus, a function, for example, a power supply, input/output or else processor function is generally associated with a module.

According to the invention, the receiving structure 10 includes, at least at a first wall, a network of first optical emitter units 31 and first optical receiver units 35. Next, this network will be referred to as the first optical network 30.

Each module 20 includes, at least at a first face, a network of second optical emitter units 41 and second optical receiver units 45. Next, this network will be referred to as the second optical network 40.

In the remainder of the description, the term "first wall" will be used to refer to one of the walls of the receiving structure 10, whether this is the upper wall, the lower wall, the backplane or the side wall.

The term "first face" will be used to refer to one of the faces of the module 20, that one which is intended to come face to face with the first wall of the receiving structure. Thus, in other words, in the case where the first wall of the receiving structure 10 is the upper wall 12, the first face of the module is the upper face 23. In the case where the first wall of the receiving structure 10 is the bottom wall 11, the first face of the module is the lower face 21. In the case where the first wall of the receiving structure 10 is the backplane 13, the first face of the module is the rear face 22. In the case where the first wall of the receiving structure 10 is a side wall 14, the first face of the module is the side face 24 facing said side wall.

Preferably, when the first wall receiving the first optical network 30 is the backplane 13, the receiving structure includes, opposite the or each slot 16, a first optical network 30.

The first optical network 30 and the second optical network 40 of an assembly 100 are positioned respectively on a first wall of the receiving structure 10 and on a first face of the module 20 such that, when said module 20 is in the operative position in the receiving structure 10, the first optical network 30 lies coincidently with the second optical network 40.

FIGS. 4 to 9 illustrate, in a non-limiting manner, a first optical network 30 at the backplane 13 of the receiving structure 10 and a second optical network 40 at the rear face 22 of the module 20.

Figure 10:
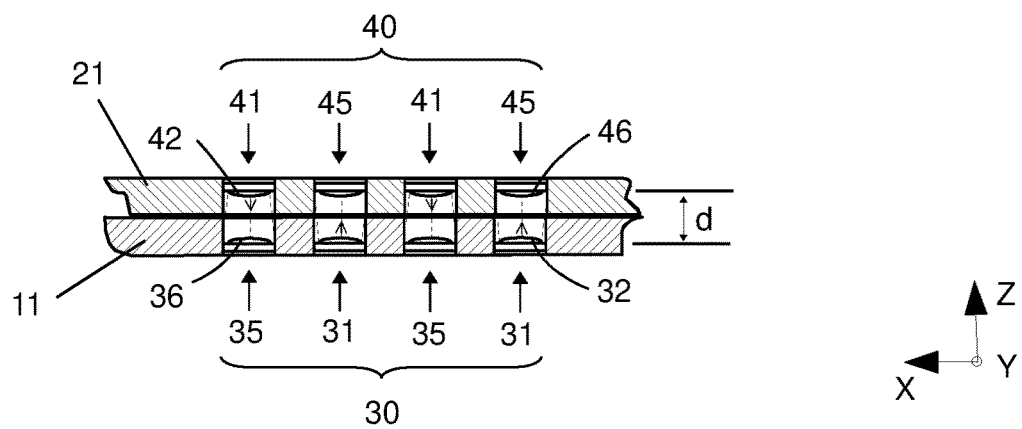
FIG. 10 represents a simplified view of an optical interface of the assembly, when the module is in the operative position, between a bottom wall of the receiving structure and a bottom face of the module.

FIG. 10 illustrates, in a non-limiting manner, a first optical network 30 at the lower wall 11 of the receiving structure 10 and a second optical network 40 at the lower face 21 of the module 20.

When said module is in the operative position in the receiving structure 10, the second optical network 40, disposed at the first face of the module 20, and the first optical network 30, disposed at the first wall of the receiving structure 10, are distant from each other by a predefined distance d.

The first optical network 30 and the second optical network 40 are arranged respectively at the first wall of the receiving structure 10 and at the first face of a module 20 so that, when said module is in the operative position in the receiving structure:
- each second optical emitter unit 41 of the first face of the module 20 is disposed opposite a first optical receiver unit 35 of the first wall of the receiving structure 10,
- each second optical receiver unit 45 of the first face of the module 20 is disposed opposite a first optical emitter unit 31 of the first wall of the receiving structure 10.

Each first optical emitter unit 31 is configured to emit an optical beam with a given wavelength $\lambda_1$. In one embodiment, in the case where the first optical network 30 is positioned at the backplane 13, said optical beam preferably has an optical axis according to the longitudinal axis. When the module 20 is in the operative position in the receiving structure 10, the optical beam of the first optical emitter unit 31 is emitted in the direction of a second optical receiver unit 45 of the second optical network 40.

Each second optical emitter unit 41 is configured to emit an optical beam with a given wavelength $\lambda_2$. In one embodiment, in the case where the second optical network 40 is positioned at the rear face 22, said optical beam preferably has an optical axis according to the longitudinal axis. When the module 20 is in the operative position in the receiving structure 10, the optical beam from the second optical emitter unit 41 is emitted in the direction of a first optical receiver unit 35 of the first optical network 30.

Preferably, the first optical emitter units 31 and the second optical emitter units 41 emit an optical beam in the infrared.

Preferably, the selected wavelengths $\lambda_1$ and $\lambda_2$ are different.

Each second optical receiver unit 45 is configured to receive the optical beam emitted by a first optical emitter unit 31.

Each first optical receiver unit 35 is configured to receive an optical beam emitted by a second optical emitter unit 41.

The distance d between the first and second optical networks 30, 40, when the module 20 is in the operative position in the receiving structure 10, is preferably defined so that the optical beam of a first (respectively second 41) optical emitter unit 31 illuminates only the second (respectively first 35) optical receiver unit 45, without illuminating the surrounding second (respectively first 35) optical receiver units 45 or second (respectively first 31) optical emitter units 41. Preferably, the distance d is defined in particular as a function of the divergence of the various optical beams emitted by the first and second optical emitter units 31, 41 and of the difference (of the pitch) separating, for each optical network 30, 40, the optical receiver or optical emitter units from each other.

In one embodiment, the distance d is selected in the range of a few millimetres to a few centimetres, preferably the distance d is comprised between 0.5 mm and 50 mm.

In a preferred embodiment, in the case where the first optical network 30 is positioned at the backplane 13 and the second optical network 40 is positioned at the rear face 22, to guarantee the desired distance d between the first and second optical networks 30, 40, the receiving structure 10, and/or the module 20, includes a stop 50 or a shoulder.

Figure 4:
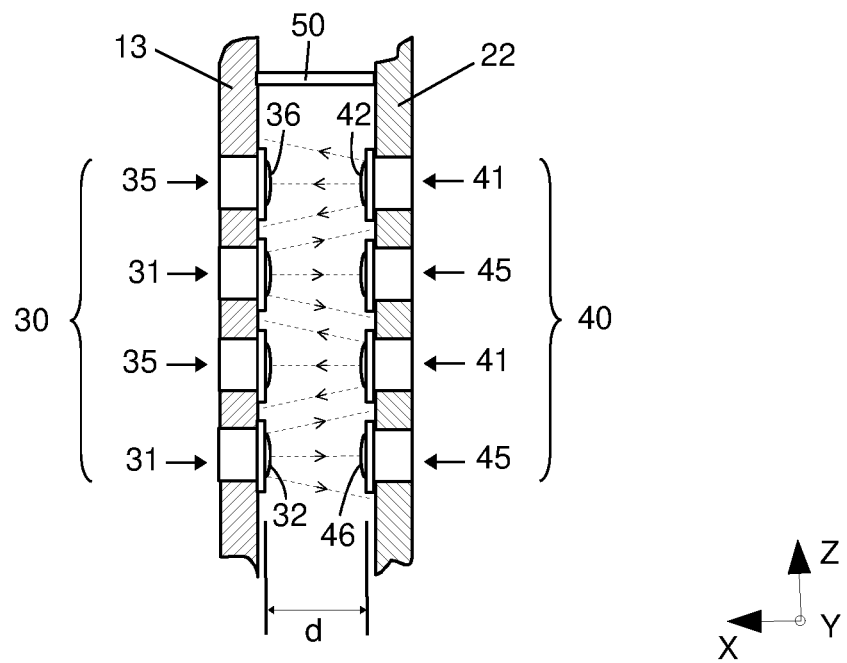
FIG. 4 represents a simplified view of an optical interface of the assembly, when the module is in the operative position, between a bottom wall of the receiving structure and a rear face of the module.

In an example of this preferred embodiment, the stop 50 may be positioned on the backplane 13 of the receiving structure 10, and extends, according to the longitudinal axis, over a length d, as illustrated in FIG. 4.

In another embodiment (not represented), the stop may be positioned on the lower wall 11 and/or the upper wall 12 of the receiving structure 10, placed at a distance d from the backplane, according to the longitudinal axis.

In another embodiment (not represented), a shoulder may be positioned on one of the faces of the module 20 and which is intended to hit at least one of the side, lower or upper walls upon insertion.

Thanks to the first and second optical networks 30, 40, and their arrangement, once the module 20 is in the operative position, the invention enables the creation, between said receiving structure and said module, of an optical interface consisting of multiple optical links. Advantageously, such an optical interface allows achieving continuity of signal transmission between the modules or between the modules and the equipment.

Figure 5:
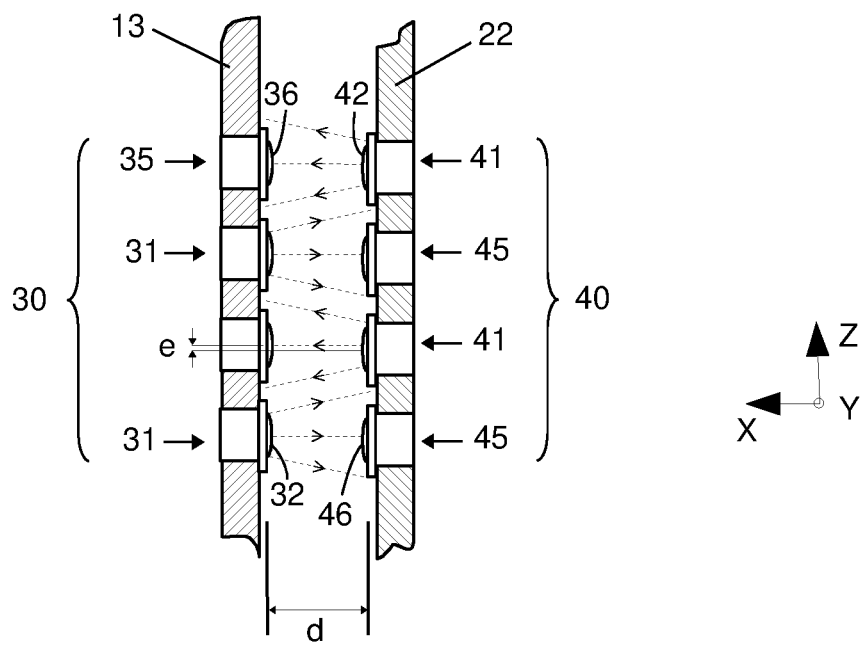
FIG. 5 represents a simplified view of the optical interface of FIG. 4, when the module is offset according to the vertical axis, between the bottom wall of the receiving structure and the rear face of the module.
Figure 11:
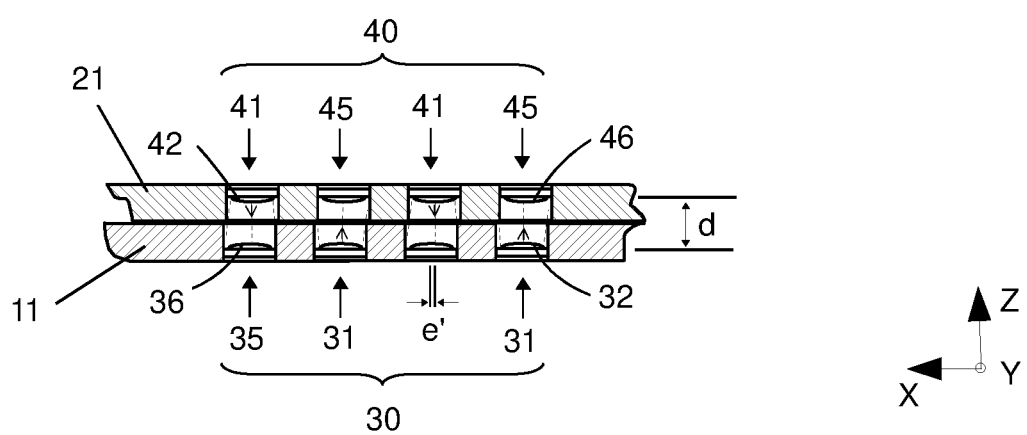
FIG. 11 represents a simplified view of the optical interface of FIG. 10, when the module is offset according to the horizontal axis, between the lower wall of the receiving structure and the lower face of the module.

Unlike a physical interface between connectors as is the case in the prior art, an optical interface is advantageous because it enables a slight offset of the optical axis of the emitted optical beam, both according to the transverse axis Y and according to the vertical axis Z. FIG. 5 illustrates an offset e according to the vertical axis, when the first optical network 30 is positioned at the backplane 13 and the second optical network 40 is positioned at the rear face 22. FIG. 11 illustrates an offset e' according to the horizontal axis, when the first optical network 30 is positioned at the lower wall 11 and the second optical network 40 is positioned at the lower face 21. This advantageously allows relieving the mechanical manufacturing constraints of the module and of the receiving structure, as well as the assembly constraints of the module in the receiving structure.

Non-limiting embodiments of the first optical network will now be described. Such examples apply by analogy with the second optical network.

The first optical network 30 includes a plurality of first optical emitter units 31 and first optical receiver units 35.

Preferably, the first optical network 30 includes as many first optical emitter units 31 as first optical receiver units 35.

Preferably, the first optical emitter units 31 of the first optical network 30 are identical to each other. Similarly, the first optical receiver units 35 are preferably identical to each other.

In an embodiment of a first optical emitter unit 31, as illustrated in FIG. 4 5, 10 or 11, said first optical emitter unit includes a light source 32, for example of the laser diode or light-emitting diode (LED) type.

FIGS. 6 to 9 illustrate different variants, in the non-limiting example where the first optical network 30 is positioned at the backplane 13 of the receiving structure and the second optical network 40 is positioned at the rear face 22 of module 20. It is clear that any other first wall and first face facing said first wall could be illustrated and described in a similar manner.

Figure 6:
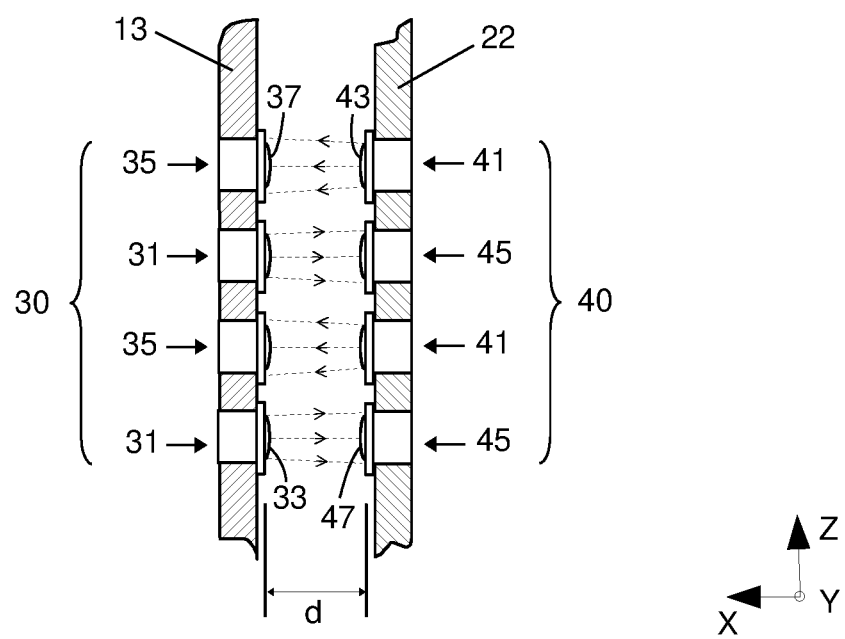
FIG. 6 represents a simplified view of an optical interface of FIG. 4, when the module is in the operative position, and illustrating the reduction of the divergence of the optical beams, between the bottom wall of the receiving structure and the rear face of the module.

In one variant, as illustrated in a non-limiting manner in FIG. 6, the first optical emitter unit may include a light source (not represented) associated with a lens 33, for example convergent. Advantageously, such a variant allows reducing the divergence of the optical beam emitted by the light source. Advantageously, said lens is disposed at the output of said light source. Preferably, the lens is affixed to the light source. Such a lens is arranged opposite the light source so as to either make the emitted optical beam converge or make the emitted optical beam collimate. When a module 20 is in the operative position in the receiving structure, said lens of the first optical emitter unit 31 is opposite the second optical receiver unit 45 of the second optical network 40.

In another variant, the first optical emitter unit 31 may include a light source associated with an optical fibre 34. Advantageously, such a variant allows offsetting the light source. Advantageously, the optical fibre is disposed at the output of the light source and is configured to transport the emitted optical beam of wavelength $\lambda_1$ from the light source. The optical fibre may be single-mode or multi-mode. When a module 20 is in the operative position in the receiving structure, a free end of the optical fibre, from which the emitted optical beam emerges, is opposite the second optical receiver unit of the second network optical.

Figure 7:
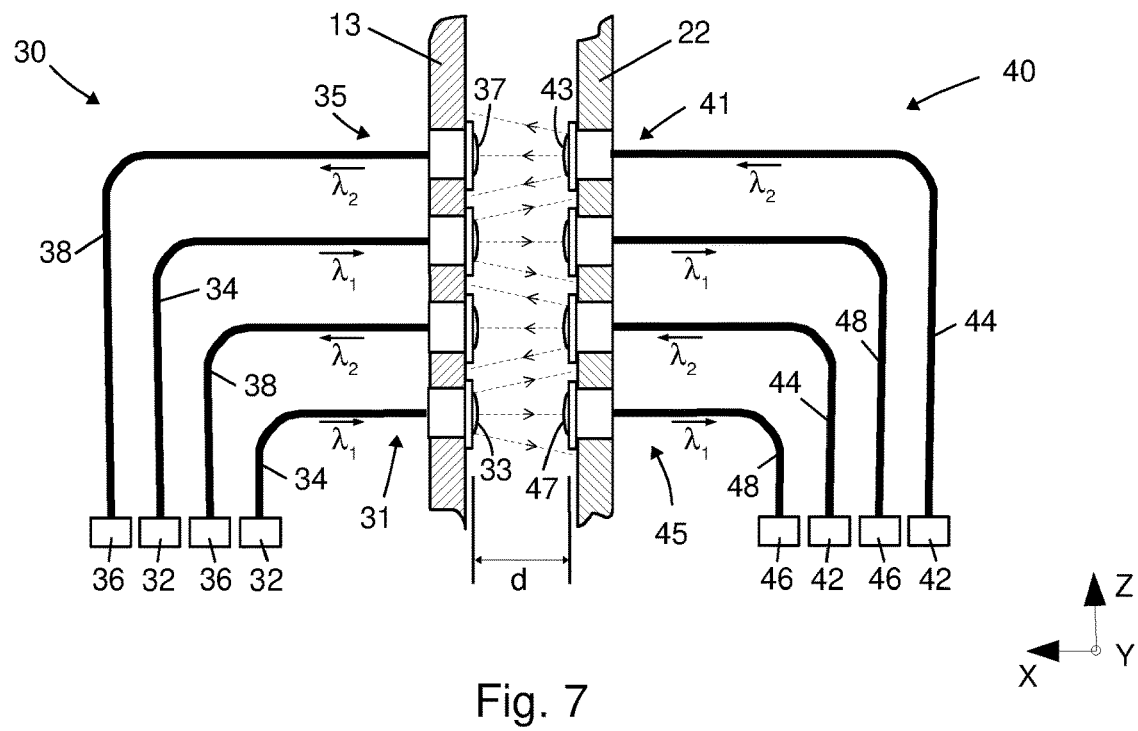
FIG. 7 represents a simplified view of the optical interface of FIG. 4, illustrating an embodiment of the first and second optical networks, between the bottom wall of the receiving structure and the rear face of the module.

In another variant, as illustrated in a non-limiting manner in FIG. 7, the first optical emitter unit 31 may include a light source associated with an optical fibre 34 and with a lens 33, for example convergent. Advantageously, the optical fibre 34 is disposed at the output of the light source and is configured to transport the emitted optical beam of wavelength $\lambda_1$ from the light source. The lens 33 is arranged at the output of the free end of the optical fibre. When a module 20 is in the operative position in the receiving structure, said lens of the first optical emitter unit 31 is opposite the second optical receiver unit 45 of the second optical network 40.

Similarly for the first optical emitter unit 31, the second optical emitter unit 41 includes the same embodiments and variants. Thus, the second optical emitter unit includes a light source 42, possibly associated with a lens 43 and/or an optical fibre 44.

In an embodiment of a first optical receiver unit 35, as illustrated in FIG. 4, 5, 10 or 11, said first optical receiver unit includes a photodiode-type photodetector 36.

In one variant, as illustrated in a non-limiting manner in FIG. 6, the first optical receiver unit 35 may include a photodetector (not represented) associated with a lens 37. Advantageously, said lens is disposed upstream of the photodetector. Said lens is arranged opposite the photodetector so that an optical beam emitted in its direction converges towards the photodetector. When a module 20 is in the operative position in the receiving structure 10, the lens 37 of the first optical receiver unit 35 is opposite the second optical emitter unit 41 of the second optical network 40. Advantageously, such a variant allows, when the module is in the operative position in the receiving structure, focusing the optical beam emitted by a second optical emitter unit 41 on the photodetector of the first optical receiver unit 35.

In one variant, the first optical receiver unit 35 may include a photodetector 36 associated with an optical fibre 38. Advantageously, such a variant allows offsetting said photodetector. When a module 20 is in the operative position in the receiving structure 10, a free end of the optical fibre 38 is opposite the second optical emitter unit 41 of the second optical network 40. The optical fibre 38 is configured to transport an optical beam of wavelength $\lambda_2$ emitted by a second optical emitter unit 41 of the second optical network 40.

In another variant, as illustrated in a non-limiting manner in FIG. 7, the first optical receiver unit 35 may include a photodetector 36 associated with an optical fibre 38 and with a lens 37. When a module 20 is in the operative position in the receiving structure, said lens of the first optical receiver unit 35 is opposite the second optical emitter unit 41 of the second optical network 40. The lens 37 allows focusing the optical beam in the optical fibre 38 which then transports said optical beam towards the photodetector 36.

Similarly for the first optical receiver unit, the second optical receiver unit 45 includes the same embodiments and variants. Thus, the second optical receiver unit 45 includes a photodiode 46, possibly associated with a lens 47 and/or an optical fibre 48.

Preferably, the first optical emitter units 31 of the first optical network 30 and the second optical emitter units 41 of the second optical network 40 are identical to each other. Similarly, the first optical receiver units 35 of the first optical network 30 and the second optical receiver units 45 of the second optical network 40 are identical to each other.

In one embodiment, when a first optical emitter unit 31 of the first optical network 30 consists only of a light source and the second optical receiver unit 45 of the associated second optical network 40 consists only of a photoreceptor, no lens is interposed on the optical path between said light source and said photoreceptor.

In one embodiment, when a first optical emitter unit 31 of the first optical network 30 consists only of a light source and the second optical receiver unit 45 of the associated second optical network 40 consists only of a photoreceiver and an optical fibre, no lens is interposed on the optical path between said light source and the free end of the optical fibre associated with said photoreceptor.

In another embodiment, in the case where a first optical emitter unit 31 of the first optical network 30 consists of a light source and an optical fibre and the second optical receiver unit 45 of the associated second optical network 40 consists only of a photoreceiver, no lens is interposed on the optical path between the free end of the optical fibre and said photoreceptor.

In another embodiment, in the case where a first optical emitter unit 31 of the first optical network 30 consists of a light source and an optical fibre and the second optical receiver unit 45 of the associated second optical network 40 consists only of a photoreceiver and an optical fibre, no lens is interposed on the optical path between the free end of the optical fibre associated with said light source and the free end of the optical fibre associated with said photoreceptor.

Preferably, in more general terms, no lens is interposed between a first optical emitter unit 31 of the first optical network 30 and a second optical receiver unit 45 of the associated second optical network 40. No lens is interposed within the distance d between the first and second optical networks 30, 40, when the module is in the operative position.

In another embodiment, in the case where a first optical emitter unit 31 of the first optical network 30 includes a light source 32 and a lens 37, the second optical receiver unit 45 of the associated second optical network 40 includes a photoreceiver 46 and a lens 47. Preferably, each lens is disposed respectively at the light source and the photoreceptor. Preferably, in general, no other lens is interposed between a first optical emitter unit 31 of the first optical network 30 and a second optical receiver unit 45 of the associated second optical network 40. No lens is interposed within the distance d between the first and second optical networks 30, 40, when the module is in the operative position.

Figure 8:
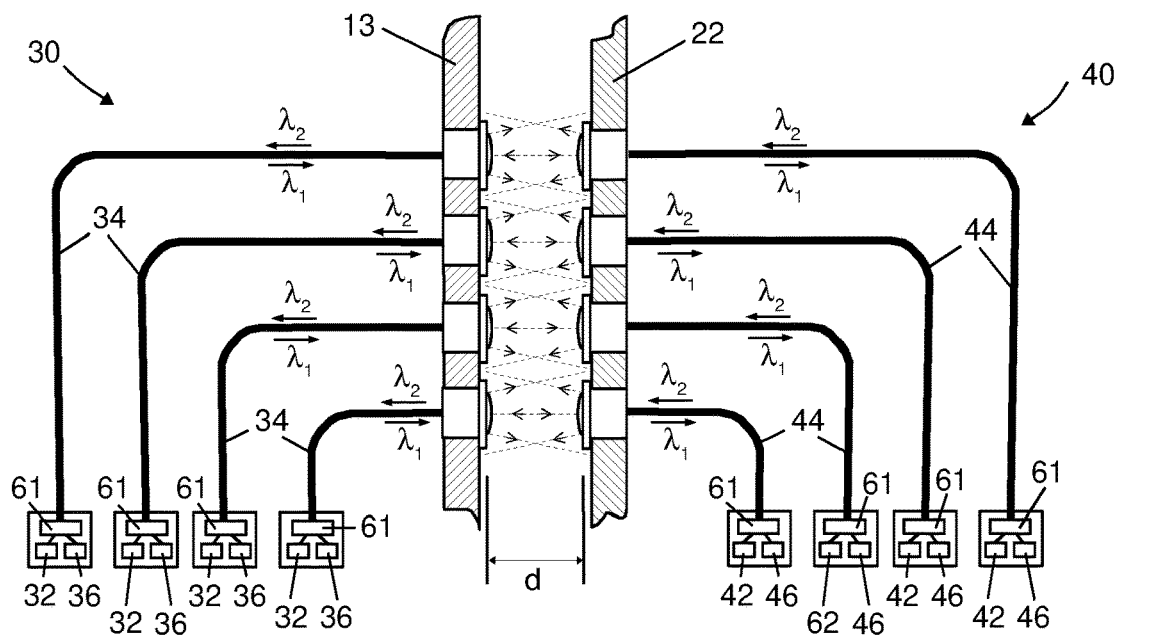
FIG. 8 represents a simplified view of the optical interface of FIG. 4, illustrating another embodiment of the first and second optical networks, between the bottom wall of the receiving structure and the rear face of the module.

In one variant, in the case where a first optical emitter unit 31 and a first optical receiver unit 35 of the first optical network 30 includes an optical fibre 34, 38, a single optical fibre, for example the fibre 34 as illustrated in a non-limiting manner in FIG. 8, could be used to bidirectionally transport on the one hand the optical beam of wavelength $\lambda_1$ emitted by the light source 32 of the first optical emitter unit and on the other hand the optical beam of wavelength $\lambda_2$ received by the photodetector 36 of the first optical receiver unit. A first optical emitter unit and a first optical receiver unit then form a first joint unit. This variant applies similarly to a second optical emitter unit and a second optical receiver unit of the second optical network. Thus, by analogy, a second optical emitter unit and a second optical receiver unit then form a second joint unit. A single optical fibre, for example the fibre 44 as illustrated in a non-limiting manner in FIG. 8, may be used to bidirectionally transport on the one hand the optical beam of wavelength $\lambda_2$ emitted by the light source 42 of the second optical emitter unit 41 and on the other hand the optical beam of wavelength $\lambda_1$ received by the photodetector 46 of the second optical receiver unit 45.

In such a variant, to ensure the bidirectional transmission of the optical beams in each optical fibre, a first joint unit and a second joint unit further includes, in a conventional manner, a wavelength multiplexer 61 or else a coupler. The wavelength multiplexer 61, respectively the coupler, is disposed between on the one hand the optical fibre 34, 44 and on the other hand the photodetector 36, 46 and the light source 32, 42.

The optical links established between the receiving structure 10 and a module 20 will then be called bidirectional links.

Such optical links, monodirectional or bidirectional, advantageously allow transporting all types of signals, in particular data signals or else power signals. Preferably, the laser diodes are suitable for the emission of data signals, the high-power light-emitting diodes for the power signals.

In the case of data signals, when a first/second optical emitter unit, including a light source of the laser diode type, receives, from a piece of equipment or from another module, an input electrical signal, it emits an optical beam which is a function of this input electronic signal. When a photodetector of a second/first optical receiver unit receives said optical beam, said photodetector transforms it back into an electrical signal.

In an embodiment of the first optical network 30, not represented in the figures, said first optical network may be in the form of one or several strip(s). For example, each strip may include an alternation of rows or columns of light sources 32 and photodetectors 36.

Afterwards, each strip could be connected, for example by welding, to the first wall of the receiving structure.

Similarly for the second optical network 40, the strip may for example include an alternation of rows or columns of light sources 42 and photodetectors 46. The strip may be connected to the first face of the module 20.

Figure 9:
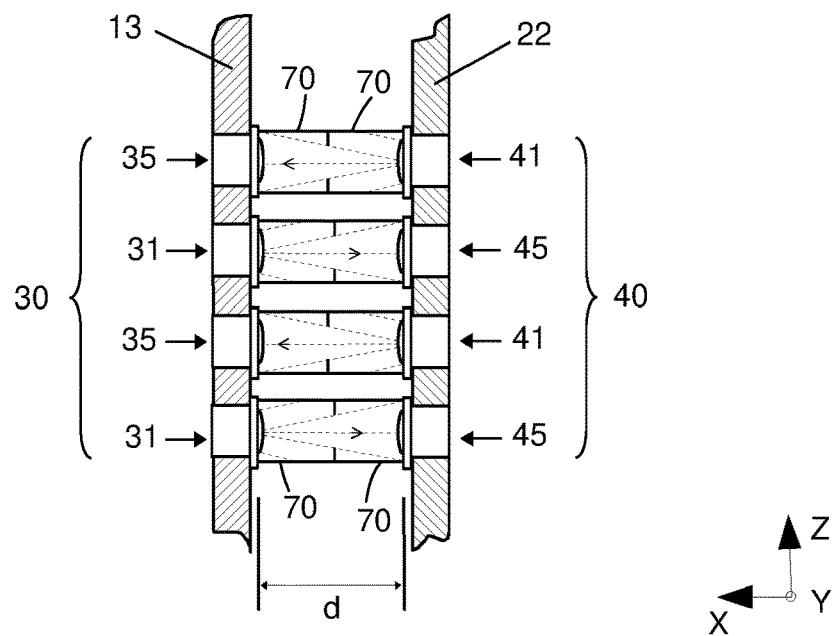
FIG. 9 represents a simplified view of the optical interface of FIG. 4, illustrating the positioning of protective seals, between the bottom wall of the receiving structure and the rear face of the module.

In a preferred embodiment, to prevent dust deposits on the optical components forming the first/second optical emitter 31, 41 and optical receiver 35/45 units, at the optical interface, a protective seal 70 may be disposed around each first/second optical emitter and optical receiver units, as illustrated in a non-limiting manner in FIG. 9. When the module 20 is in the operative position in the receiving structure 10, each protective seal 70 located at the first optical network 30 is intended to come into contact with a protective seal 70 located at the second optical network 40. Said two protective seals 90 are configured to open upon contact with each other, following a pressure exerted thereon, so as to let the optical beam emitted from a first optical emitter unit 31 pass towards a second optical receiver unit 45 or to make the optical beam emitted from a second optical emitter unit 41 pass towards a first optical receiver unit 35.

In such a configuration, such a protective seal 70 also advantageously allows circumscribing the beam emitted by the first optical emitter unit 31, respectively the second optical emitter unit, 41 towards the associated second optical receiver unit 45, respectively the first optical receiver unit 35. It then also allows increasing the distance d between the first and second optical networks 30, 40.

In one variant, not represented, a protective seal 70 may be arranged around all of the first optical emitter and optical receiver units of the first optical network 30, respectively all of the second optical emitter and optical receiver units of the second optical network 40. When the module 20 is in the operative position in the receiving structure 10, the protective seal 70 located at the first optical network 30 is intended to come into contact with the protective seal 70 located at the second optical network 40 and the two protective seals are configured to open upon contact with each other so as to let all of the optical beams emitted by the first and the second optical emitter units pass.

The description hereinbefore clearly illustrates that by its various features and their advantages, the present invention achieves the objectives it had set. In particular, it provides an assembly that allows making optical interfaces with the modules, at all of the walls of the receiving structure, and no longer only at the backplane. The invention advantageously allows multiplying the number of optical interfaces in an assembly. In addition, the invention allows overcoming the positioning of the receiving structure in its environment.

The invention claimed is:
1. An assembly comprising:
   an avionics cabinet comprising a plurality of slots and a first wall;
   a module insertable into a slot of the avionics cabinet according to a longitudinal axis and reversibly held fixed therein in an operative position, the slot being one of said plurality of slots, the module comprising a first face opposite the first wall of the avionics cabinet;

wherein the first wall of the avionics cabinet comprises, at each slot, a first optical network comprising first optical emitters and first optical receivers;

wherein the first face of the module comprises a second optical network comprising second optical emitters and second optical receivers;

when the module is in the operative position in the slot of the avionics cabinet, the first optical network of the slot, the second optical network are remote from each other by a predefined distance;

wherein each second optical emitter is disposed opposite a first optical receiver of the first optical network in the slot; and wherein each second optical receiver is disposed opposite a first optical emitter of the first optical network in the slot.

2. The assembly of claim 1, wherein at least one of each first optical emitter of the first optical network in the slot and said each second optical emitter unit comprises a light source.

3. The assembly of claim 1, wherein at least one of each first optical receiver of the first optical network in the slot and said each second optical receiver comprises a photodetector.

4. The assembly of claim 2, wherein the first optical network in each slot is in a form of a strip comprising an alternate rows or columns of light sources and photodetectors.

5. The assembly of claim 1, wherein at least one of each first optical emitter of the first optical network in the slot and said each second optical emitter comprises a light source associated with an optical fiber.

6. The assembly of claim 1, wherein the first optical network of the slot comprises a first protective seal disposed around each first optical emitter and each first optical receiver; wherein the second optical network comprises a second protective seal disposed around said each second optical emitter and said each second optical receiver; and wherein, when the module is in the operative position in the slot of the avionics cabinet, the first protective seal located at the first optical network in the slot is configured to open in contact with the second protective seal located at the second optical network.

7. An avionics cabinet for an assembly of claim 1.

8. A module for an assembly of claim 1.

9. An aircraft comprising an assembly of claim 1, the assembly being configured to be integrated into an avionics bay.

* * * * *